United States Patent [19]
Nugent

[11] Patent Number: 5,685,621
[45] Date of Patent: Nov. 11, 1997

[54] SNOWMOBILE STUD WITH REPLACEABLE TIP

[76] Inventor: David Scott Nugent, 4376 St. Anthony, Temperance, Mich. 48182

[21] Appl. No.: 712,158

[22] Filed: Sep. 11, 1996

[51] Int. Cl.$^6$ ............................................. B62D 55/26
[52] U.S. Cl. ................................... 305/180; 305/165
[58] Field of Search ................................. 305/54, 35 R, 305/35 EB, 38, 165, 167, 168, 180, 187, 191; 36/114, 124, 126, 127, 128, 129, 134

[56] References Cited

U.S. PATENT DOCUMENTS

| | | |
|---|---|---|
| 3,572,851 | 3/1971 | Schuler . |
| 3,782,787 | 1/1974 | Rubel et al. . |
| 3,838,894 | 10/1974 | Reedy . |
| 3,883,190 | 5/1975 | Kilbane, Jr. . |
| 3,930,689 | 1/1976 | Maki . |
| 3,973,808 | 8/1976 | Janssen et al. . |
| 4,059,315 | 11/1977 | Jolliffe et al. . |
| 4,218,101 | 8/1980 | Thompson . |
| 4,332,424 | 6/1982 | Thompson . |
| 4,758,055 | 7/1988 | Anderson . |
| 4,795,221 | 1/1989 | Simmons . |
| 4,938,546 | 7/1990 | Simmons . |
| 5,033,801 | 7/1991 | Beeley . |
| 5,188,441 | 2/1993 | Rubel . |
| 5,201,574 | 4/1993 | James et al. . |
| 5,234,266 | 8/1993 | Musselman et al. . |
| 5,273,351 | 12/1993 | Rubel . |
| 5,284,386 | 2/1994 | Rubel . |
| 5,299,860 | 4/1994 | Anderson . |
| 5,354,124 | 10/1994 | James . |

OTHER PUBLICATIONS

Roetin Traction Control System 1994 Catalog.
Woody's Traction and Control Products 1994 Catalog.
Saber Snowmobile Traction Products 1995 Catalog.

*Primary Examiner*—Russell D. Stormer
*Attorney, Agent, or Firm*—MacMillan, Sobanski & Todd

[57] ABSTRACT

A two-piece traction stud for a snowmobile track includes a base and a tip. The base includes a cylindrical shank preferably having external threads. A planar head extends perpendicular to the shank. The tip includes a first end terminating in a point. A second end opposite the first end has a recess formed therein. The recess is sized to receive the shank and preferably has internal threads for cooperatively engaging the external threads of the shank. The track of the snowmobile has a plurality of apertures formed therethrough. A plurality of studs is mounted in the apertures. The base of the stud is mounted by pushing the shank through an aperture, and securing a fastener onto the shank. Then the tip of the stud is threaded or otherwise secured onto the shank.

20 Claims, 4 Drawing Sheets

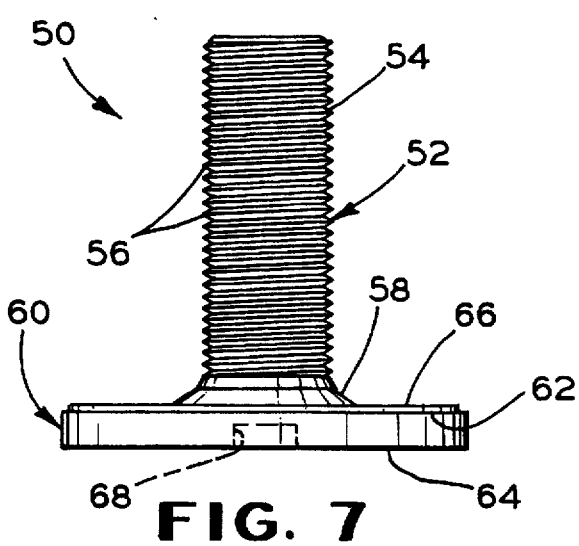
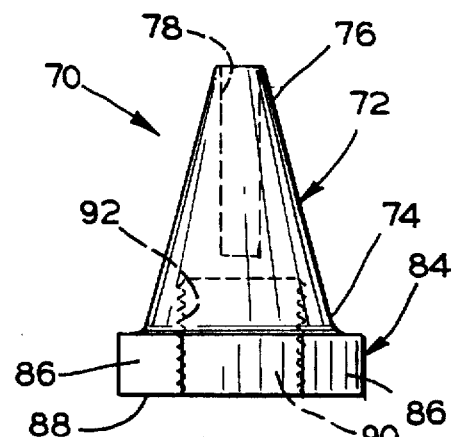
FIG. 7
FIG. 8
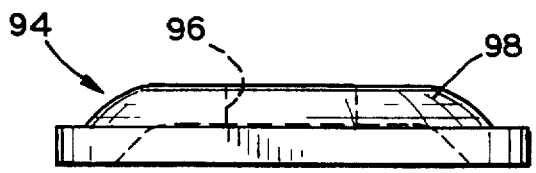
FIG. 9
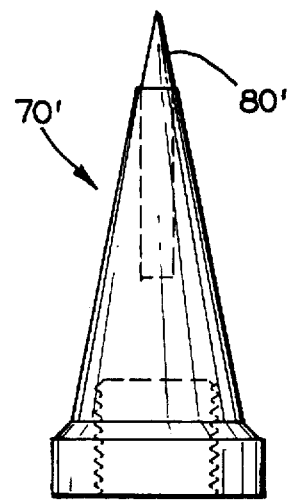
FIG. 11
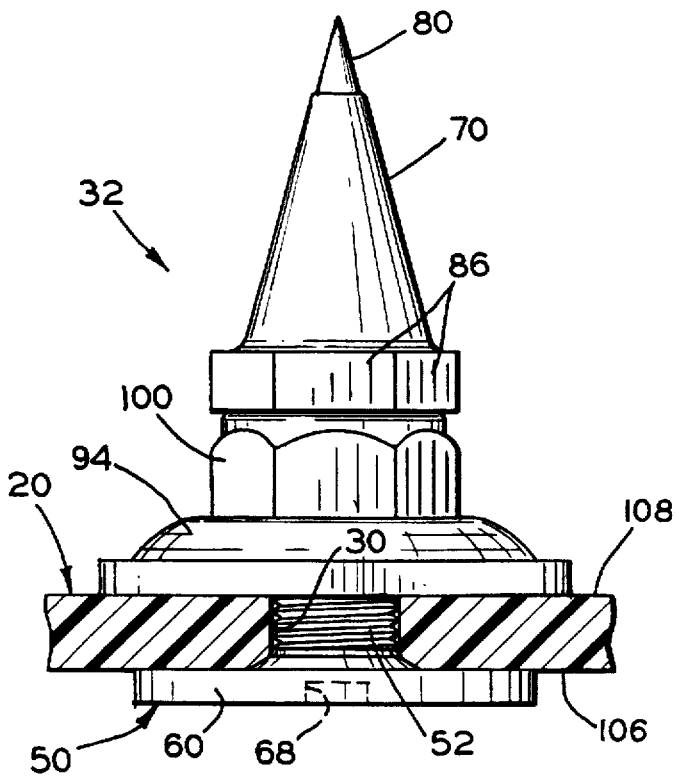
FIG. 10
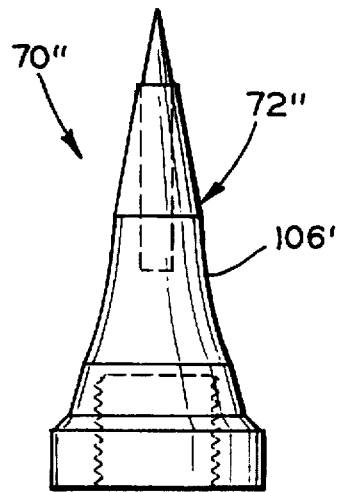
FIG. 12

5,685,621

SNOWMOBILE STUD WITH REPLACEABLE TIP

BACKGROUND OF THE INVENTION

This invention relates in general to traction studs for snowmobiles, and in particular to a two-piece stud having a replaceable tip.

Snowmobiles are a widely used means of transportation in snowy regions. They are very popular for recreational purposes such as trail riding and lake racing. Snowmobiles are operated on a variety of different terrains, particularly snowy surfaces and icy surfaces.

A snowmobile is usually equipped with an endless track which is driven by an engine. The track engages the surface to be traversed to cause forward movement of the snowmobile. When the snowmobile is driven on a slippery surface such as ice, the track may lose traction with the surface. This can impede the forward progress of the snowmobile and make it difficult to control.

It is known to mount studs on the track of a snowmobile to increase the traction. A conventional snowmobile stud has a one-piece metallic body. The stud usually includes a cylindrical shank having external threads. A conical tip is formed at one end of the shank, and a planar head is formed perpendicular to the shank at the other end thereof. The stud is mounted by pushing the shank through an aperture in the track until the head abuts the track. Then the stud is tightly secured to the track by a washer and a nut which is threaded onto the shank.

The tip of the stud engages the snowy or icy surface to be traversed to increase the traction. After a period of time, the tip becomes worn and loses its usefulness. The tip of the stud may also break off from the shank. When the tip becomes worn or breaks off, it has been necessary to replace the entire stud with a new stud. Unfortunately, replacement of the entire stud is expensive and time consuming. Thus, it would be desirable to provide a snowmobile stud that does not require complete replacement when the tip becomes worn or breaks off.

SUMMARY OF THE INVENTION

This invention relates to a two-piece stud for increasing the traction of a snowmobile track. The stud includes a base adapted to be secured to the track. The base includes an elongated, generally cylindrical shank. The shank preferably has external threads formed thereon. A generally planar head extends generally perpendicular to the shank. The stud further includes a generally conical tip. The tip includes a first end terminating in a point. Preferably, the point is a separate piece formed of a hard metal adapted for securing to the tip. An enlarged flange portion is formed at a second end of the tip opposite the first end. The flange portion is adapted to receive a wrench thereon. A recess is formed in the second end of the tip. The recess is sized to receive the shank and preferably has internal threads for cooperatively engaging the external threads of the shank. The track of the snowmobile has a plurality of apertures formed therethrough. A plurality of studs is mounted in the apertures. The shank of the base of a stud is pushed through each aperture. Then an enlarged washer is slipped onto the shank, and a fastener such as a nut is secured to the shank to secure the base to the track. The tip of the stud is then threaded or otherwise secured onto the shank.

Various objects and advantages of this invention will become apparent to those skilled in the art from the following detailed description of the preferred embodiment, when read in light of the accompanying drawings.

BRIEF DESCRIPTION OF THE DRAWINGS

FIG. 7 is a side elevational view of the base of the two-piece stud of FIG. 6.

FIG. 8 is a side elevational view of the tip of the two-piece stud of FIG. 6.

FIG. 9 is a side elevational view of a washer for use in mounting the two-piece stud.

FIG. 10 is a side elevational view, partly in cross section, of the two-piece stud mounted in an aperture in a snowmobile track.

FIG. 11 is a side elevational view of an alternate embodiment of the tip of the two-piece stud.

FIG. 12 is a side elevational view of another alternate embodiment of the tip of the two-piece stud.

DETAILED DESCRIPTION OF THE PREFERRED EMBODIMENT

Figure 1:
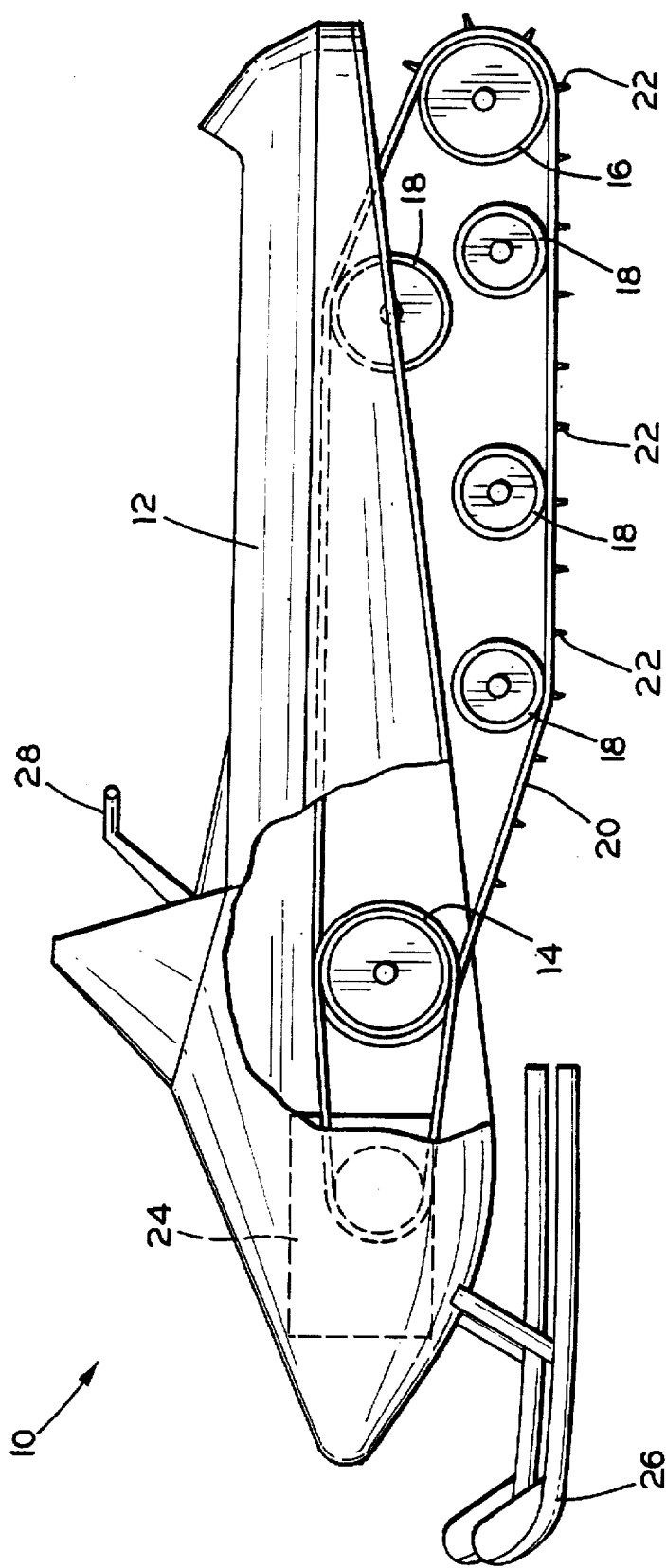
FIG. 1 is a schematic side elevational view of a snowmobile.

Referring now to the drawings, a snowmobile 10 is illustrated in FIG. 1. The snowmobile 10 includes an elongated body 12 formed of materials such as steel, aluminum, fiberglass and plastic. A rotatable drive wheel 14 is mounted near the front end of the body 12, and a rotatable rear idler wheel 16 is mounted near the rear end of the body 12. A plurality of intermediate idler wheels 18 are mounted between the drive wheel 14 and rear idler wheel 16. An endless track 20 is trained around the wheels for movement in an endless path of travel. A plurality of studs 22 for improving traction are mounted on the track 20. The drive wheel 14 is driven to rotate by an engine 24. Rotation of the drive wheel 14 causes movement of the track 20 to propel the snowmobile 10 forwardly. A pair of skis 26 controlled by a steering wheel 28 are provided for steering the snowmobile 10.

Figure 2:
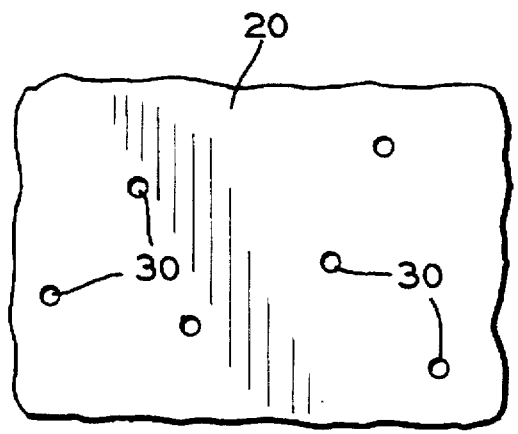
FIG. 2 is a plan view of a portion of a snowmobile track, showing apertures formed through the track.
Figure 3:
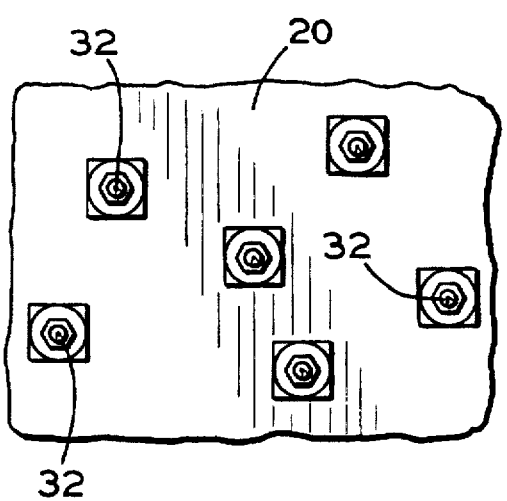
FIG. 3 is a plan view of a portion of a snowmobile track, showing studs mounted in the apertures.

A portion of the endless track 20 is shown in FIGS. 2 and 3. The track is a wide, flat belt formed of a resilient material such as rubber. The track has a plurality of apertures 30 formed therethrough. The apertures 30 can be cut or punched through the resilient material of the track 20. Preferably, the apertures 30 are not longitudinally or transversely aligned with each other. A plurality of studs 32 for improving traction are mounted in the apertures.

Figure 4:
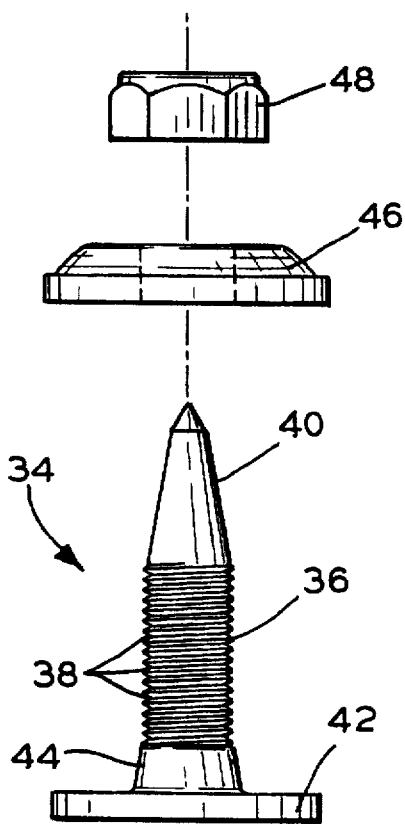
FIG. 4 is a side elevational view of a one-piece stud of the prior art.
Figure 5:
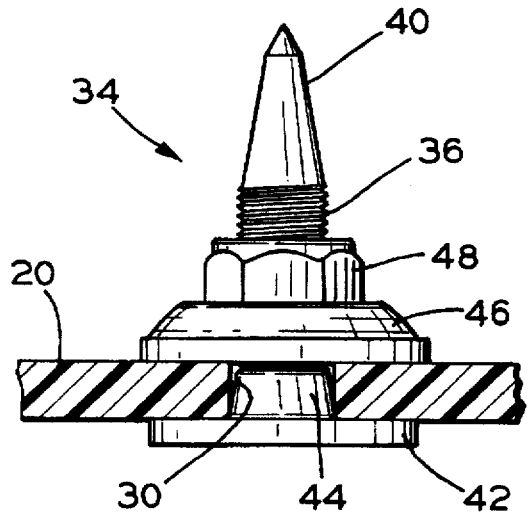
FIG. 5 is a side elevational view, partly in cross section, of the prior art stud mounted through an aperture of a snowmobile track.

FIGS. 4 and 5 illustrate a conventional one-piece stud 34 of the prior art. The stud includes an elongated, cylindrical shank 36 having external threads 38. A conical tip 40 is formed at one end of the shank 36. A planar head 42 is formed at the other end of the shank 36, and extends perpendicular to the shank 36. The prior art stud 34 is mounted by pushing the shank 36 through an aperture 30 in the track 20. A shoulder 44 is formed between the shank 36 and the head 42. The shoulder 44 is sized to be disposed within an aperture 30 in the track 20. A washer 46 is slipped onto the shank 36, and a nut 48 is threaded onto the shank 36 and tightened. The head 42 engages one side or the backside of the track 20, and the washer 46 engages the other side or the top side to secure the stud 34 to the track.

During operation of the snowmobile, the tip 40 of the prior art stud 34 engages the surface to be traversed to increase the traction. As discussed above, the tip 40 becomes worn after a period of time. The tip 40 may also break off from the remaining portion of the stud 34. Because of the one-piece construction of the prior art stud 34, the entire stud must be replaced when the tip 40 becomes worn or breaks off.

Figure 6:
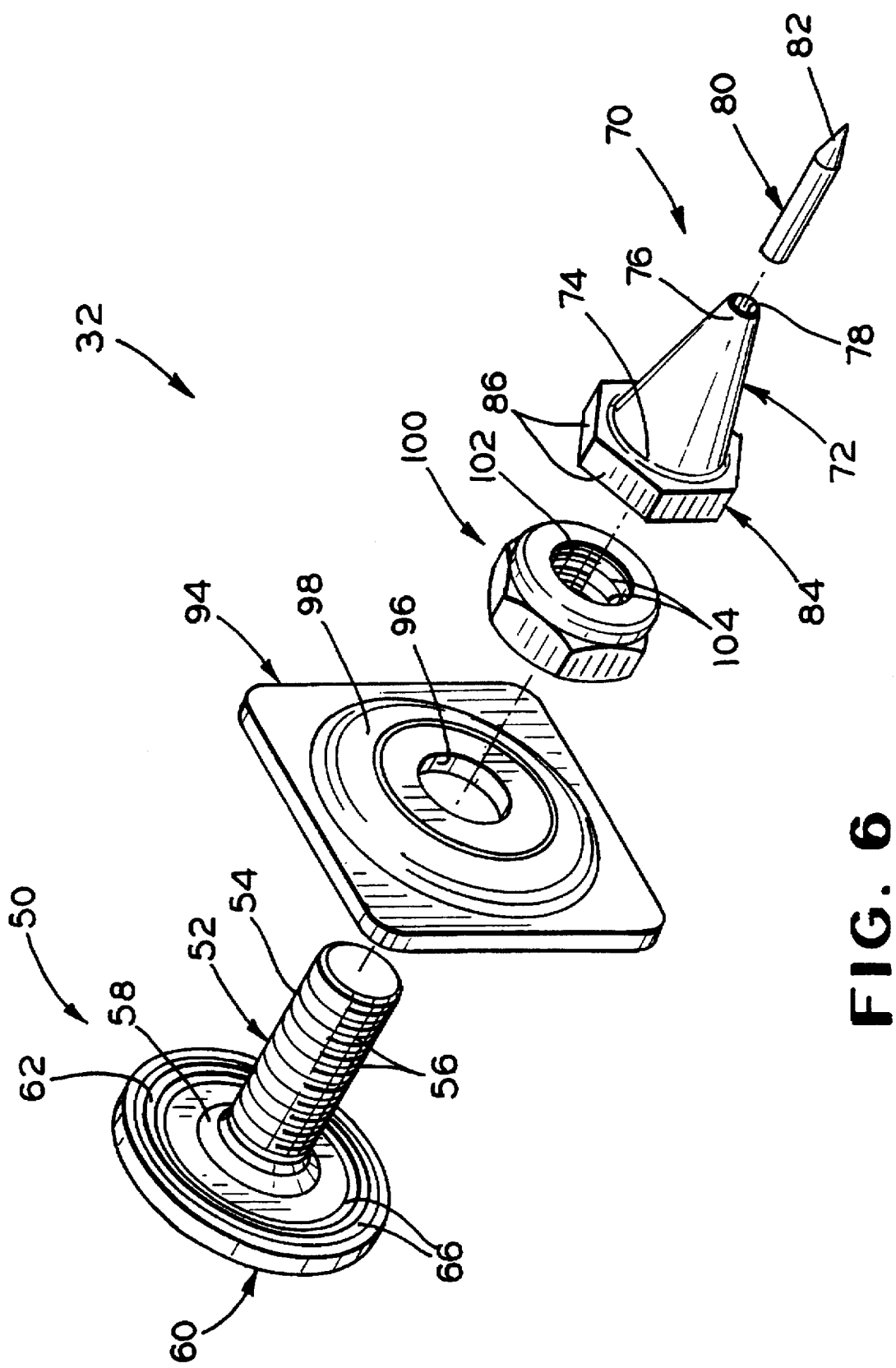
FIG. 6 is an exploded perspective view of a two-piece stud according to the present invention.

Referring now to FIGS. 6 and 7, a two-piece stud according to the present invention is illustrated generally at 32. The stud 32 includes a base 50 adapted to be secured to the track of a snowmobile. The base 50 is usually formed of steel or stainless steel, but other materials can also be used. The base 50 includes an elongated, generally cylindrical shank 52. The shank 52 usually has a length from about ½ inch to about 1 inch, and a diameter from about ¼ inch to about ⅜ inch, and typically about 5/16 inch. The shank 52 includes a cylindrical portion 54 which preferably has external threads 56 formed thereon. The shank 52 also includes a shoulder 58 formed integrally with the cylindrical portion 54.

A generally planar head 60 is formed integrally with the shoulder 58, and extends generally perpendicular to the shank 52. Preferably, the head 60 is generally circular in shape, but it can also be square, rectangular, or other shapes. The illustrated head 60 usually has a diameter from about ⅞ inch to about 1⅛ inch, and a thickness from about 1/16 inch to about ⅛ inch.

The head 60 includes an outer surface 62 adjacent to the shank 52, i.e., oriented toward the track 20, and an inner surface 64 opposite the shank 52, i.e., oriented away from the track 20. Preferably, a pair of concentric annular protrusions 66 is formed on the outer surface 62. A central recess 68 is formed in the inner surface 64 of the head 60. The recess 68 preferably has a hexagonal or square cross section. The purpose of the recess 68 will be described below.

As shown in FIGS. 6 and 8, the stud also includes a tip 70 adapted to engage the surface to be traversed to increase the traction of the snowmobile. Unlike the illustrated prior art stud, the tip 70 is not formed integrally with the shank 52. Rather, the tip 70 is a separate piece adapted for joining with the base 50 to form a two-piece stud 32. The tip 70 is usually formed of steel or stainless steel, but other materials can also be used. The illustrated tip 70 is generally conical in shape. The tip 70 usually has a length from about ½ inch to about 1 inch, and typically from about ¾ inch to about 1 inch. The overall length of the two-piece stud 32, with the tip 70 secured to the base 50, is usually from about 1 inch to about 1⅝ inch, and preferably from about 1⅛ inch to about 1½ inch.

The tip 70 includes a central portion 72 which tapers from an enlarged diameter inner end 74 to a reduced diameter outer end 76. In the preferred embodiment, a longitudinally extending cylindrical recess 78 is formed in the outer end 76 of the central portion 72. A generally cylindrical point 80 having a generally conical outer end 82 is secured in the recess 78 by any suitable method such as welding. Alternatively, the point 80 can be formed integrally with the outer end 76 of the central portion 72. Preferably, the point 80 is formed of a very hard metal such as carbide. The diameter of the point 80 is preferably from about 1/16 inch to about ¼ inch, and more preferably from about 3/32 inch to about ⅛ inch.

An enlarged flange portion 84 is formed integrally with the inner end 74 of the central portion 72 of the tip 70. The flange portion 84 is sized to receive a wrench thereon. The flange portion 84 has a plurality of wrench flats 86 formed on its peripheral surface so that the tip can be tightened with a wrench. Preferably, the flange portion 84 is generally hexagonal in cross section.

The tip 70 has an inner face 88 formed adjacent to the wrench flats 86 and generally perpendicular thereto. The inner face is oriented toward or facing the head 60 of the base 50. A longitudinally extending, cylindrical central recess 90 is formed through the inner face 88 and through the flange portion 84. The recess 90 usually extends within the tip a distance of from about ⅓ to about ⅔ of the length of the tip. The recess 90 is sized to receive the shank 52 of the base 50 therein. The recess 90 preferably has internal threads 92 for cooperatively engaging the external threads 56 of the shank 52.

As shown in FIGS. 6 and 9, the two-piece stud 32 is mounted by use of a large washer 94. The illustrated washer 94 is generally square and planar in shape, but it can also be other shapes such as circular. The washer is formed of aluminum, steel, stainless steel, or other suitable materials. Preferably, the area of the washer 94 is at least as large as the area of the head 60 of the base 50, and more preferably it is slightly larger than the head 60. The washer 94 has a generally circular, central aperture 96 formed therethrough. The aperture 96 is sized to receive the shank 52 of the base 50 therethrough. The illustrated washer 94 is formed with a generally circular crown 98 for maximum support of the base 50. Preferably, the crown 98 has approximately the same diameter as the head 60 of the base 50.

A fastener such as a lock nut 100 is also provided for mounting the two-piece stud 32. The lock nut 100 has a central aperture 102 sized to receive the shank 52 of the base 50. The aperture 102 preferably has internal threads 104 for cooperatively engaging the external threads 56 of the shank 52. However, the fastener can also be secured to the shank by other means.

As shown in FIGS. 6 and 10, the two-piece stud 32 of the present invention is easily mounted on the track of a snowmobile. The track 20 includes an inner surface 106 and an outer surface 108, and has an aperture 30 formed therethrough. The base 50 is mounted by pushing the shank 52 through the aperture 30 until the head 60 abuts the inner surface 106 of the track 20. The washer 94 is slipped onto the shank 52 and against the outer surface 108 of the track 20. The lock nut 100 is then threaded or otherwise secured onto the shank 52. While the lock nut 100 is being threaded onto the shank 52, an L-end wrench (not shown) is inserted into the central recess 68 of the base 50 to prevent the base 50 from turning. The lock nut 100 is tightened against the washer 94 to secure the base 50 to the track 20. The head 60 of the base 50 engages the inner surface 106 of the track 20, and the washer 94 engages the outer surface 108 of the track 20.

After the stud is mounted on the track, the tip 70 of the stud 32 is mounted on the base 50. Preferably, the tip 70 is threaded onto the shank 52, with the internal threads 92 of the recess 90 cooperatively engaging the external threads 56 of the shank 52 (shown in FIGS. 7 and 8). However, the tip 70 can be secured to the shank 52 by any suitable means, such as by a pin or a snap-on arrangement. Preferably, the tip 70 is releasably secured. The illustrated tip 70 is tightly secured to the shank 52 by use of a wrench on the wrench flats 86.

When it is mounted on the track 20, the tip 70 of the stud 32 extends outwardly from the outer surface 108 of the track 20. During operation of the snowmobile, the tip 70 of the stud 32 engages the surface to be traversed to increase the traction. If the tip 70 becomes worn and loses its traction, the tip 70 can be replaced without the necessity of replacing the entire stud 32. Because the base 50 of the stud 32 does not become worn and does not break, the base 50 can remain mounted on the track 20 for use over an extended period.

The shape and length of the tip can be varied to adjust for different surfaces to be traversed or different driving conditions. For example, an alternate embodiment of a tip 70' is illustrated in FIG. 11. The tip 70' has a very sharply angled point 80' of about 22°. The tip 70 shown in FIG. 8 also has a sharply angled point 80 of about 30°. Tips having a point with an angle from about 20° to about 50° are particularly suited for aggressive traction on icy surfaces, such as during lake racing. The tip could also be formed with a 60° or 75° angled point (not shown) for improved durability over a range of surfaces, such as during trail riding. Preferably, the tip is formed with a point tapered at an angle from about 20° to about 90°, and more preferably from about 30° to about 65°. The tips can be changed easily and quickly for different riding conditions. This contrasts with the time consuming replacement of prior art studs.

FIG. 12 illustrates another alternate embodiment of a tip 70" having a central portion 72" formed with an inwardly extending radius 106'. The tip 70" has about the same durability as the tip 70, but the radius 106' reduces material costs in manufacturing the tip 70".

Other suitable shapes of tips include a shovel point tip and an arrow head tip (not shown). In general, the shape of the tip can be any shape suitable for use on the track of a snowmobile.

Any conventional method can be used to manufacture the tip and base. For example, the tip and base may be machined from metal stock or formed by casting.

In addition to using the tip 70 with the base 50 to form the stud 32 of the present invention, the tip 70 can also be used to repair a conventional snowmobile stud. For example, when the tip of a conventional stud breaks off, the tip 70 can be secured to the remaining portion of the stud which acts as a base. The end of the broken stud can be machined or cut if necessary to fit the replacement tip 70.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A stud for increasing traction of a snowmobile track comprising:
   a base including a generally cylindrical shank and a generally planar head extending generally perpendicular to the shank, and
   a tip secured to the shank of the base, the tip including a first end terminating in a point, and a second end opposite the first end having a recess formed therein which is sized to receive the shank of the base.

2. The stud defined in claim 1 wherein the point is a separate piece from the tip and is secured to the first end of the tip.

3. The stud defined in claim 1 wherein the shank of the base has external threads, and the recess of the tip has internal threads adapted for cooperatively engaging the external threads of the shank.

4. The stud defined in claim 1 wherein the tip includes an enlarged flange portion at the second end thereof, the flange portion having a peripheral surface with a plurality of flats formed thereon.

5. The stud defined in claim 1 wherein the recess in the tip extends within the tip a distance of from about ⅓ to about ⅔ of the length of the tip.

6. The stud defined in claim 1 wherein the point forms an angle from about 30° to about 65°.

7. The stud defined in claim 1 wherein the tip has a length from about ½ inch to about 1 inch.

8. The stud defined in claim 1 wherein the tip is generally conical in shape with an inwardly extending radius.

9. A stud assembly for increasing traction of a snowmobile track comprising:
   a two-piece stud comprising a base and a tip, the base including a generally cylindrical shank and a generally planar head extending generally perpendicular to the shank, and the tip secured to the shank of the base, the tip including a first end terminating in a point, and a second end opposite the first end having a recess formed therein which is sized to receive the shank of the base,
   a washer having an aperture sized to receive the shank therethrough, and
   a fastener secured to the shank and having a recess sized to receive the shank.

10. The stud assembly defined in claim 9 wherein the washer is at least as large as the head of the base.

11. The stud assembly defined in claim 10 wherein the washer includes a crown having about the same size and shape as the head of the base.

12. The stud assembly defined in claim 9 wherein the point is a separate piece from the tip and is secured to the first end of the tip.

13. The stud assembly defined in claim 9 wherein the shank of the base has external threads, and the recess of the tip has internal threads adapted for cooperatively engaging the external threads of the shank.

14. The stud assembly defined in claim 9 wherein the tip includes an enlarged flange portion at the second end thereof, the flange portion having a peripheral surface with a plurality of flats formed thereon.

15. The stud assembly defined in claim 9 wherein the recess in the tip extends within the tip a distance of from about ⅓ to about ⅔ of the length of the tip.

16. A drive track assembly for propelling a snowmobile comprising:
   an endless track movable in an endless path of travel, the track having a plurality of apertures formed therethrough, and
   a plurality of stud assemblies mounted in the apertures of the track, each stud assembly comprising:
   a two-piece stud comprising a base and a tip, the base including a generally cylindrical shank and a generally planar head extending generally perpendicular to the shank, and the tip secured to the shank of the base, the tip including a first end terminating in a point, and a second end opposite the first end having a recess formed therein which is sized to receive the shank of the base,
   a washer having an aperture sized to receive the shank therethrough, and a fastener secured to the shank and having a recess sized to receive the shank.

17. The drive track assembly defined in claim 16 wherein the point is a separate piece from the tip and is secured to the first end of the tip.

18. The drive track assembly defined in claim 16 wherein the shank of the base has external threads, and the recess of the tip has internal threads adapted for cooperatively engaging the external threads of the shank.

19. The drive track assembly defined in claim 16 wherein the tip includes an enlarged flange portion at the second end thereof, the flange portion having a peripheral surface with a plurality of flats formed thereon.

20. The drive track assembly defined in claim 16 wherein the recess in the tip extends within the tip a distance of from about $1/5$ to about $2/5$ of the length of the tip.

* * * * *